Oct. 13, 1931.  J. I. HAASE  1,827,650
MACHINE FOR BUILDING RUBBER CONDUITS
Filed July 27, 1929  2 Sheets-Sheet 1

Inventor
Jorgen I. Haase
By R. S. Trogner
Attorney

Oct. 13, 1931. J. I. HAASE 1,827,650
MACHINE FOR BUILDING RUBBER CONDUITS
Filed July 27, 1929 2 Sheets-Sheet 2

Inventor
Jorgen I. Haase

By
Attorney

Patented Oct. 13, 1931

1,827,650

UNITED STATES PATENT OFFICE

JORGEN I. HAASE, OF AKRON, OHIO, ASSIGNOR TO THE GOODYEAR TIRE & RUBBER COMPANY, OF AKRON, OHIO, A CORPORATION OF OHIO

MACHINE FOR BUILDING RUBBER CONDUITS

Application filed July 27, 1929. Serial No. 381,664.

This invention relates to the manufacture of conduits composed of rubber and fabric and it has particular relation to a machine for assembling the rubber and fabric upon an elongate mandrel, preparatory to vulcanization of the assembly.

One object of the invention is to provide a machine for manufacturing conduits in which rubber and fabric comprising the latter are spirally folded about a mandrel as they are conducted thereto.

Another object of the invention is to provide devices for folding rubber and fabric about a mandrel which are so adjustable that they may be employed in conjunction with different sizes of mandrels.

As heretofore practiced, various methods have been employed for manufacturing rubber conduits. For example, a common method comprised so rolling a mandrel laterally over an elongate strip of rubberized fabric that the fabric was wound thereabout into cylindrical form. This method was very successful, although its practice required considerable labor especially where the mandrel was of considerable length. Moreover, the pressure applied to the fabric frequently varied throughout the length of the latter as it was applied to the mandrel.

Another method comprised conducting fabric longitudinally of a mandrel through a funnel-shape device which automatically folded the fabric about the mandrel. Where this method was employed, it also was difficult to apply pressure uniformly upon the fabric because the funnel did not exert a uniform pressure against the mandrel but merely directed the fabric to approximately the form thereof.

According to this invention, a pair of oppositely spiraled brushes are disposed upon opposite sides of a mandrel and, owing to the resiliency of the bristles, they exert a resilient but uniform pressure against the mandrel. By reason of the spiral formation of the brushes, the fabric, as it is conducted between them and the mandrel, is folded about the latter and firmly pressed against it. Another feature of the invention resides in such an adjustability of the brushes that different sizes of mandrels may be employed and therefore different sizes of conduits may be manufactured.

For a better understanding of the invention, reference may now be had to the accompanying drawings, forming a part of the specification, in which.

Figure 1:
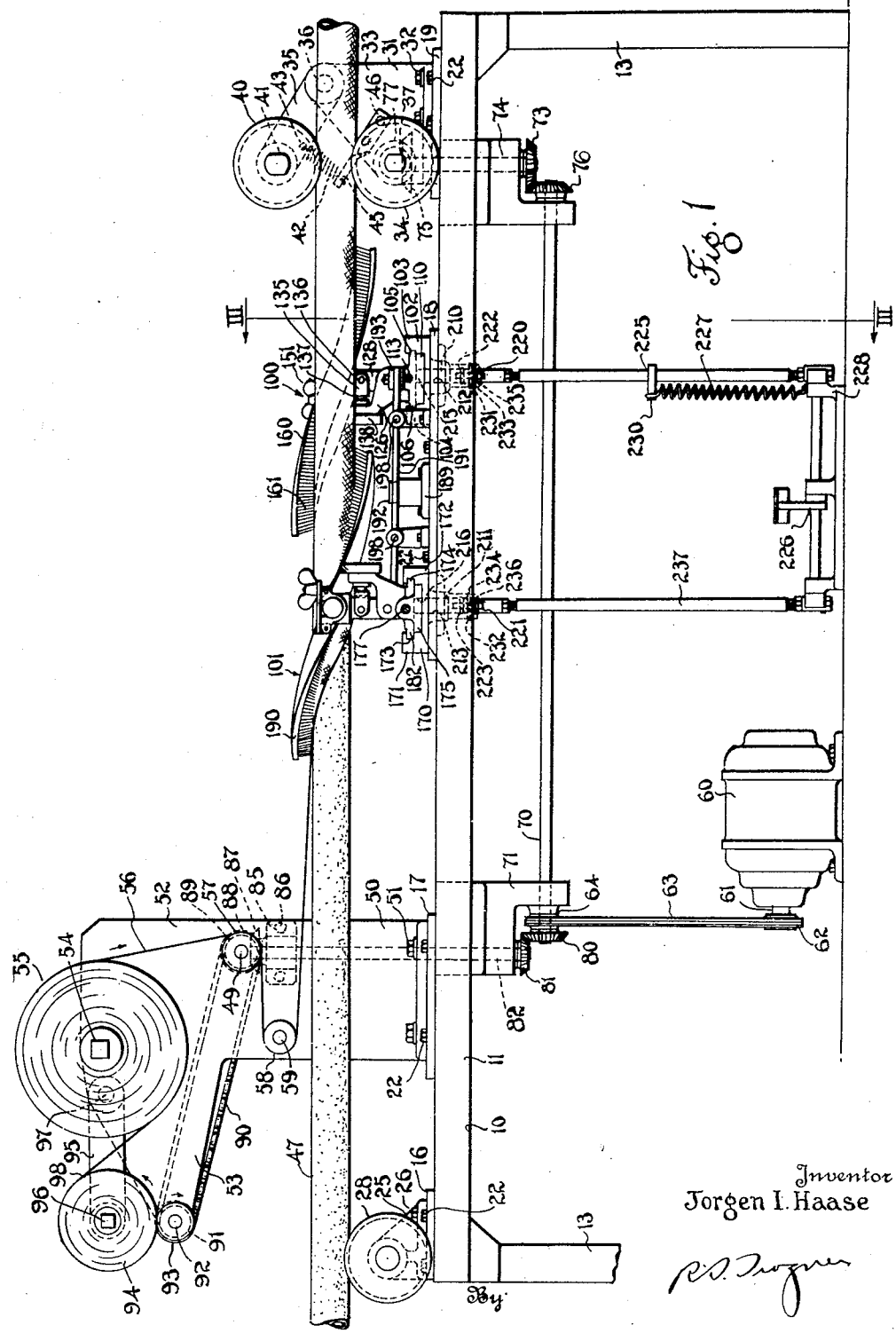
Fig. 1 is an elevational view of a machine constructed according to one embodiment of the invention.
Figure 3:
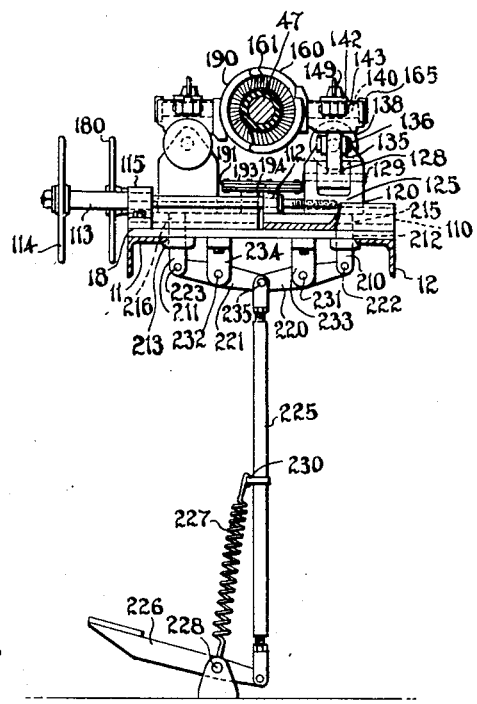
Fig. 3 is a cross-sectional view taken substantially along the line III—III of Fig. 1.

Referring to Figs. 1 and 3, a framework 10 is composed of horizontal frame members 11 and 12 and vertical frame members 13. The upper sides of the frame members 11 and 12 are interconnected by spaced plates 16, 17, 18 and 19 which are bolted thereto, as indicated at 22. The plate 16 is disposed at the end of the framework adjacent the vertical frame member 13 and supports a bearing bracket 25 that is bolted to the plate, as indicated at 26, and in which a grooved roller 28 is journaled. The plate 19 is disposed at the opposite end of the framework and supports a bearing bracket 31 that is bolted thereto, as indicated at 32. This bracket has a vertically projecting plate portion 33 which rotatably supports a shaft 37 having a grooved roller 34 secured thereto that is aligned with the roller 28.

An arm 35, pivoted at one end, as indicated at 36, to the vertically projecting portion 33 of the bracket 31 and above the roller 34 has a grooved roller 40 journalled at its opposite end upon a pin 41 secured thereto. The rollers 34 and 40 are disposed in the same vertical plane and the latter roller is resiliently urged toward the roller 34 by a spring 42 connected at one end to the arm 35 as indicated at 43, and at its other end to a bracket 45 rigidly secured to the vertically projecting portion 33 of the bracket, as indicated at 46. The rollers 28 and 34 are adapted to support a cylindrical mandrel 47 while the roller 40, being resiliently pressed downwardly, engages the upper surface of the mandrel and holds it firmly in engagement with the roller 34.

The plate 17 supports a bearing bracket 50 bolted thereto as indicated at 51. This bracket has a vertically projecting plate portion 52 which, at its upper end, has a laterally offset portion 53. A shaft 54, journaled in the upper portion of the plate 52, is adapted to support a roll of fabric 55. Fabric 56 from the roll 55 is conducted over a pair of rollers 57 and 58, that are secured to shafts 49 and 59 journaled in the plate 52 and thence to the mandrel 47.

A motor 60, mounted on the floor beneath the framework 10, is provided with a shaft 61 having a sprocket wheel 62 thereon. A chain 63, trained over the sprocket wheel 62 also is trained over a sprocket wheel 64 which is rigidly secured to a shaft 70 journaled in bearing brackets 71 and 72 depending in spaced relation from the horizontal frame member 11. On the end of the shaft 70 opposite the sprocket wheel 64, a bevel gear 76 is rigidly secured, which meshes with a bevel gear 73 rigidly secured to the lower end of a vertically disposed shaft 74 also journaled in the bracket 72. The upper end of the shaft 74 is provided with a bevel gear 75 which meshes with a bevel gear 77 rigidly secured to the shaft 37. Hence, the roller 34 is positively driven and by its engagement with the mandrel 47 moves the latter longitudinally of the framework 10.

The shaft 70 adjacent the sprocket wheel 64 is provided with a bevel gear 80 which meshes with a bevel gear 81 secured to the lower end of a vertical shaft 82 that is journaled at its lower end in the bracket 71 and at its upper end in a bearing bracket 85 secured to the plate 52 as indicated at 86. The upper end of the shaft 82 is provided with a bevel gear 87 which meshes with a bevel gear 88 secured to the shaft 49 of the roller 57. It follows that the roller 57, being driven positively, unwinds the fabric 56 from the roll 55. The shaft 49 of the roller 57 also is provided with a sprocket wheel 89 about which a chain 90 is trained. The latter in turn is trained about a sprocket wheel 91 secured to a shaft 92 journaled in the laterally offset portion 53 of the plate 52. The latter shaft is provided with a roller 93 which has peripheral engagement with a roller 94 journaled in the free end of an arm 95, as indicated at 96. This arm is pivoted, as indicated at 97, to the plate 52 adjacent the shaft 54. The roller 94 is adapted to unwind a liner disposed between the convolutions of fabric 56 on the roll 55, simultaneously with the unwinding of the fabric 56.

The plate 18, secured to the upper sides of the horizontal frame members 11 and 12, supports a pair of fabric folding devices, indicated generally at 100 and 101. As best shown by Fig. 1, the fabric folding device 100 comprises a base 102 having vertically projecting sides 103 and 104 which respectively have in their adjacent sides, guide grooves 105 and 106. A slide 110 is disposed between the vertical projections 103 and 104 and, as shown by Fig. 3, is provided at one end with a vertically projecting bearing bracket 112. A screw 113 is non-slidably journaled in the bracket 112 and also slidably journaled in a bearing 115 integral with the frame plate 18. One end of the screw is provided with an operating hand wheel 114, while the other end thereof has a screw threaded engagement with a second slide 120 that is disposed above the slide 110 and has edge portions disposed in the grooves 105 and 106 in the base 102. Hence, when the hand wheel 114 is rotated, the slide 120 is moved relative to the slide 110.

The slide 120 is provided with an upwardly extending bifurcated portion 125 and an offset bearing portion 126 (Fig. 1). Between the bifurcated ends of the bifurcated portion 125, a vertically projecting bar 128 has its lower end pivoted upon a pin 129 that is mounted in such ends. This bar 128 is adjustably connected to the offset bearing portion 126 by a bifurcated bracket 135 having its bifurcated ends pivotally connected to the bar, as indicated at 136, and having a screw threaded connection with a screw 137 rotatably but non-slidably journaled in the offset bearing portion 126. A disc 138, secured to the screw, facilitates rotation of the latter and adjustment of the bar 128 relative to the offset bearing portion 126. The upper end of the bar 128 has a semi-cylindrical recess 140 opening upwardly which receives a trunnion 141. The trunnion is rigidly secured to a spirally formed bar 160 which, on its inner surface, is provided with bristles 161. This bar is disposed spirally about one half the circumference of the mandrel 47.

Figure 2:
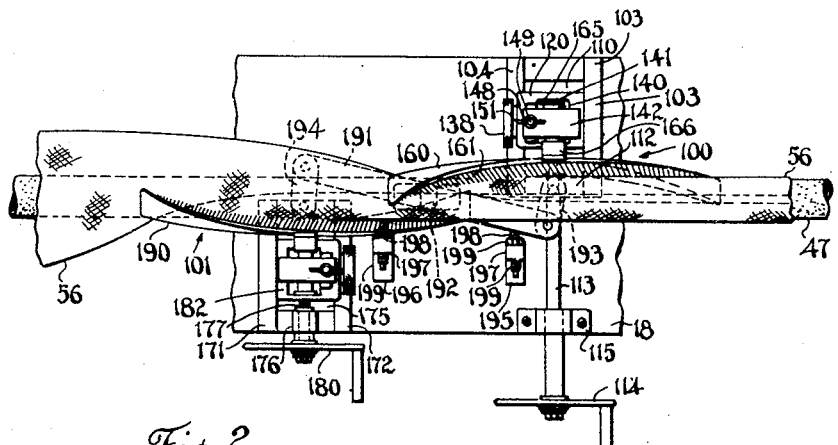
Fig. 2 is a fragmentary plan view of the construction illustrated by Fig. 1.

A collar 165 on the end of the trunnion remote with respect to the bar 160, normally is disposed in an enlarged end portion of the recess 140, thereby preventing longitudinal movement of the trunnion in one direction with respect to the recess. A block 166 on the trunnion at the opposite end of the recess 140 prevents longitudinal movement of the trunnion in the opposie direction with respect to the recess. The trunnion 141 further is retained in the recess 140 by a plate 142 pivoted, as indicated at 143, to the bar 128 and normally disposed over the shaft 141. As best shown by Fig. 2, the plate 142, at its end opposite its pivot 143, is provided with a slot 148 adapted to receive a bolt 149 pivoted at its lower end to the bar 128 on the side thereof opposite the pivot 143. A wing nut 151, threaded on the outer end of the bolt and abutting the plate 142, retains the plate firmly against the trunnion 141.

The folding device 101 is similar to the folding device 100 and comprises a base 170 having vertically projecting portions 171 and 172 in the adjacent sides of which grooves 173 and 174 respectively are provided. As best shown by Figs. 1 and 2, a slide 175 is disposed between the vertically projecting portions 171 and 172 of the base 170. This slide is provided with a vertically projecting bearing bracket 176 in which a screw 177 is rotatably but non-slidably journaled. At its outer end, the screw is provided with an operating wheel 180, while at its inner end, it is threaded into a second slide 182 which has edge portions disposed within the groves 173 and 174 in the vertically projecting portions 171 and 172 of the base 170. The slide 182 is identical with the slide 120 previously described and supports a spiral brush 190, which is spiralled oppositely with respect to the spiralled brush 160 and engages the opposite side of the mandrel 47.

The slides 110 and 175 are interconnected by a bar 191 which is pivoted intermediate its ends, as indicated at 192, to a bracket 189 projecting upwardly from the frame plate 18. Opposite ends of the bar 191 are pivotally secured to ends of the slides 110 and 175 by means of pairs of links 193 and 194. In order to limit movement of the bar 191 about its pivot 192, screw devices 195 and 196 are mounted on the plate 18 on opposite sides of the pivot 192 and are adapted selectively to engage opposite ends of the bar 191. Each of these screw devices comprises a bearing 197 mounted upon the plate 18 and has a screw 198 projecting therethrough that is adapted to engage the bar 191. These screws are adjustably locked in position by lock nuts 199 threaded thereon and abutting opposite sides of the bearing 197.

In order to lock the slides 110 and 175 in their operative positions, a locking mechanism (Figs. 1 and 3) is provided, which comprises bars 210 and 211, slidably projecting respectively through vertically disposed openings 212 and 213 in the plate 18 and like openings in the bases 102 and 170 respectively. Also, these bars are adapted to project into openings 215 and 216 in the slides 110 and 175 respectively. The bars 210 and 211 at one end are pivotally connected respectively to arms 220 and 221 by means of pins 222 and 223. These arms are pivotally connected intermediate their ends, by pins 231 and 232, to brackets 233 and 234 respectively, which depend from the frame plate 18. The other ends of the arms 220 and 221 are pivotally connected by pins 235 and 236 respectively to vertically projecting rods 225 and 237 which are pivotally secured at their lower ends to a treadle 226. The rods 225 and 237 are resiliently retained in their lower positions by a spring 227 connected at its lower end to a bracket 228 to which the foot treadle 226 is pivoted and at its upper end to the rod 225, as indicated at 230.

In operation of the machine, as aforedescribed, rotation of the motor 60 causes rotation of the roller 34 and hence, movement of the mandrel longitudinally thereof. Operation of the motor also causes feeding of the fabric 56 to the mandrel and winding of the liner 95 upon the liner roll 94. With the spirally formed brushes in their operative position, it is evident that the fabric is folded about the mandrel and resiliently pressed thereagainst at all points. After the mandrel is covered with fabric, operation of the foot pedal 226 releases the slides 110 and 175 and permits movement of the brushes in reverse directions to inoperative positions on opposite sides of the mandrel. This permits a second mandrel to be positioned between the brushes without interference by the latter.

The brush 190 can be moved with respect to the mandrel 47 by rotation of the hand wheel 180. It will be observed from the previous description that the screw 177 secured to the hand wheel 180 is non-slidably journaled in a bearing bracket 176 which forms part of the slide 175. The screw also is threaded into a second slide 182 which supports the brush 190. It is evident that when the hand wheel 180 is rotated that the slides 175 and 182 are moved with respect to each other and hence that the brush 190 is moved towards or from the slide 175. Similarly the brush 160 mounted on the slide 120 can be moved with respect to the slide 110 by rotation of the hand wheel 114, because the screw 112 rigid with the hand wheel is non-slidably journaled in a bracket 112 secured to the slide 110 and has a threaded end projecting into the slide 120.

Inasmuch as the slides 110 and 175 are interconnected by a bar 191 pivoted, as indicated at 192, to a stationary part of the framework, any movement of either of the slides 110 and 175 results in a corresponding movement of the other slides but in an opposite direction. Hence, if the hand wheel 114 for example is moved toward the mandrel, the brush 160 is moved away from the opposite side of the mandrel, while the brush 190 is moved in a direction opposite that in which the brush 160 is moved, and also away from the mandrel.

From the foregoing description, it is apparent that a machine has been provided for folding rubber and fabric about a mandrel in such manner that the fabric is firmly pressed against the latter at all points. Owing to the resiliency of the bristles on the spirally formed brushes, this pressure of the fabric against the mandrel is resilient and hence prevents any damage to the rubber and fabric. By reason of the adjustability of the spiral brushes relative to their supports and to each other, it is evident that mandrels of different sizes may be accommodated and that conduits of different sizes may be manufactured. Moreover, spiral brushes of different sizes may be employed merely by substituting one brush for another.

Although I have illustrated but the preferred forms which the invention may assume and have described those forms in detail, it will be apparent to those skilled in the art that the invention is not so limited but that various modifications may be made therein without departing from the spirit of the invention or from the scope of the appended claims.

What I claim is:

1. A machine for manufacturing conduits upon a mandrel comprising means for moving the mandrel longitudinally, means for feeding fabric to the mandrel, and a member spiralled about the mandrel for folding the fabric about the latter, said member having bristles on its side adjacent the mandrel.

2. A machine for manufacturing conduits upon a mandrel comprising means for moving the mandrel longitudinally, means for feeding fabric to the mandrel, a fabric folding member spiralled about a portion of the mandrel, a second fabric folding member spiralled about another portion of the mandrel, and means for simultaneously moving the members toward or away from the mandrel.

3. A machine for manufacturing conduits upon a mandrel comprising means for moving the mandrel longitudinally, means for feeding fabric to the mandrel, a fabric folding member spiralled about a portion of the mandrel, a second fabric folding member spiralled about another portion of the mandrel, means for moving the members simultaneously toward or away from the mandrel, and means for separately adjusting each member relative to the mandrel.

4. A machine for manufacturing conduits upon a mandrel comprising means for moving the mandrel longitudinally, means for feeding fabric to the mandrel, a pair of fabric folding members disposed on opposite sides of the mandrel, each member being disposed adjustably on a support, a bar pivoted intermediate its ends to a stationary pivot and having its ends movably secured to the supports, and means for moving the bar about its pivot.

5. A machine for manufacturing conduits upon a mandrel comprising means for moving the mandrel longitudinally, means for feeding fabric to the mandrel, a pair of fabric folding members disposed on opposite sides of the mandrel, each member being disposed adjustably on a support, a bar pivoted intermediate its ends to a stationary pivot and having its ends movably secured to the supports, means for moving the bar about its pivot, and means for locking the bar in one position.

6. A machine for manufacturing conduits upon a mandrel comprising means for moving the mandrel, means for feeding sheet material to the mandrel, and a pair of fabric folding brushes spiralled about the mandrel in opposite directions.

7. In a conduit building machine, a mandrel about which fabric or the like is to be folded, a member having bristles on its side adjacent the mandrel, the bristles being adapted to contact with the fabric or the like to fold it around the mandrel, and means for moving the mandrel relative to the member.

8. In a conduit building machine, a mandrel about which fabric or the like is to be folded, and a pair of brushes spiralled about the mandrel in opposite directions.

9. A machine for manufacturing conduits upon a mandrel comprising a pair of members spiralled about the mandrel in opposite directions for folding fabric or the like about the later, means for adjusting each of the members with respect to the other and to the mandrel, and means for moving the members simultaneously.

In witness whereof, I have hereunto signed my name.

Signed at Akron, in the county of Summit and State of Ohio, U. S. A., this 26th day of July, 1929.

JORGEN I. HAASE.